Figure 1:
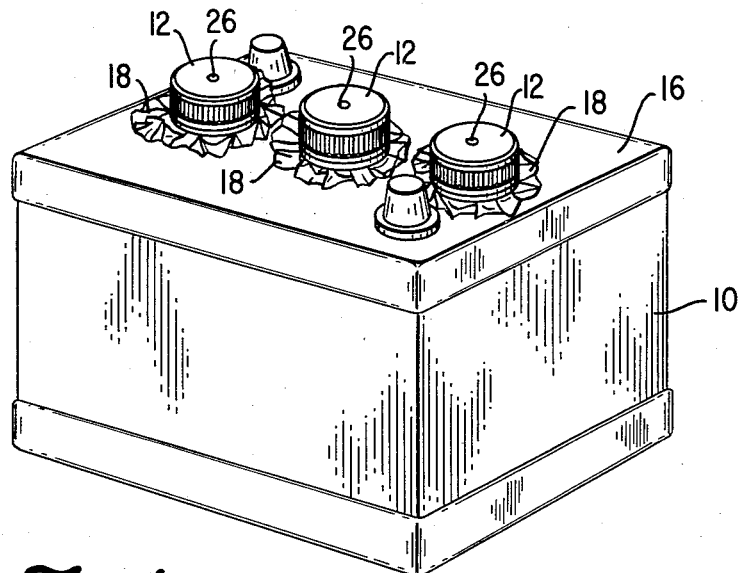

Feb. 14, 1961 W. R. CLINGENPEEL 2,972,001
WATER-PROOF VENT SEAL FOR BATTERIES
Filed May 14, 1958

INVENTOR.
WILLIAM R. CLINGENPEEL
BY
*Fahey, Souther & Stoltenberg*
ATTORNEYS

United States Patent Office 2,972,001
Patented Feb. 14, 1961

2,972,001

WATER-PROOF VENT SEAL FOR BATTERIES

William R. Clingenpeel, Toledo, Ohio, assignor to The Electric Auto-Lite Company, Toledo, Ohio, a corporation of Ohio Filed May 14, 1958, Ser. No. 735,162

3 Claims. (Cl. 136—170)

This invention relates to battery seals, more particularly to temporary seals for a dry-charged battery which is to be protected from atmospheric conditions during storage.

In the use of dry-charged batteries, it is often necessary to store these batteries for protracted periods, during which time it is essential to protect the plates from atmospheric conditions, particularly humidity, which may cause moisture absorption in the plates of the cells to destroy their utility. The present invention contemplates the provision of a seal at the vent plug of the cell, which will protect the plates of a dry-charged battery cell for long periods of time from the effects of atmospheric conditions, even though the battery is stored in the open to the full action of the weather.

It is, therefore, a principal object of this invention to provide a weather-proof seal in the form of a film at the vent plug of a battery, which can be used with a dry-charged cell to protect the plates from the effects of atmospheric conditions.

It is a further object of the invention to provide a film, which, when positioned in cooperative relation with the vent plug of a battery, will provide an effective hermetic seal to protect the plates of the cell from atmospheric conditions.

It is a further object of this invention to provide an effective seal in the form of a tough adhesive film which can easily be applied and removed from the vent plug of a battery cell.

Figure 2:
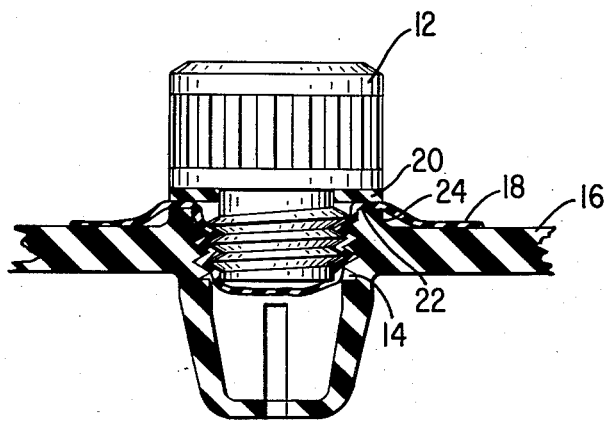

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views:

Referring to the drawings:

Fig. 1 is a perspective view of a battery to which the invention has been applied; and Fig. 2 is a sectional elevation of a vent plug to which the invention is applied.

Referring to the drawings, particularly to Fig. 1, a battery 10 is shown, which is of a conventional 6-volt design having three vent plugs 12, fitted into threaded apertures 14 in a monolithic cover 16. The plates (not shown) of the cells are of a dry-charged type, which are capable of being stored for long periods of time without substantial deterioration if moisture is not allowed to enter the cell. These batteries are made ready for service by the addition of the electrolyte which activates the battery and prepares it for delivery of energy for use in an automotive vehicle or the like.

The container and cover are hermetically sealed at the time of manufacture, and the vent plugs 12, which are also of conventional design, and their threaded relation with the cover 16, are the only places at which moisture may enter the battery container to cause deterioration of the battery plates during storage. These dry-charged batteries are often stored for many months under very adverse conditions, particularly when supplied to the armed services, which require that seals remain tight even when the batteries are left in the open subject to all conditions of weather, or even thrown into shallow water of the sea or a river for relatively short periods of time.

To provide a seal which will be efficient under these adverse conditions, a tough film of polyester material is utilized which is preferably 1 mil in thickness, which can be obtained commercially as No. 850 polyester tape supplied by Minnesota Mining and Manufacturing Company, which tape has one side cover with a 1 mil layer of a pressure-sensitive acrylate adhesive. The basic film is manufactured from polyethylene-terephthalate, which is a product of a condensation reaction between ethylene glycol and terephthalic acid, being available commercially under the name of Dupont Mylar.

The type or film 18 is cut into squares of suitable size, or any other convenient conformation sufficient to adequately cover the vent opening 14 in the cell cover 16, when the vent plug 12 is screwed into the threaded opening of the cover as shown in Fig. 2. To apply the film squares to the battery, the film portions are placed over the vent openings 14, with the vent plugs 12 removed, with the tacky side of the tape down. The vent plugs 12 are then screwed into position, so that the film 18 is positioned between the cooperating threads until the conventional gasket 20 is firmly pressed against the upper surface 22 of the boss 24 with the film 18 positioned between, substantially as shown in Fig. 2. The film 18, being very tough, is not torn during this operation, and, therefore, forms an impermeable membrane which hermetically seals the opening 14 of the cell cover and also closes the venting aperture 26 in the vent plug 12.

The membrane or film 18, with its adhesive, is forced into sealing relation with the cover 16, firstly, at the surface 22, against which it is forced by the vent plug 12, and, secondly, in its relation with the threads in the aperture 14, whereby the film is positioned between the cooperating threaded portions on the vent plug 12 and the aperture 14 in the cover. The adhesive under the pressure applied when the film is positioned between the threads of the cooperating parts, tends to flow and fill all voids such as may be formed by folds in the film to form an excellent seal. These seals have been found to be moisture and water-proof for periods in excess of 18 months in unprotected outdoor storage for dry-charged batteries.

The seal formed by the film must be broken when it is desired to activate the battery. The adhesive adheres to the cover 16 and when the plug 12 is removed, it will cause the film to remain in position on the cover, so that it must be torn out before electrolyte may be added to the battery cell to activate it.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a hermetic seal for the filling opening of a battery container, a vent plug adapted to fit into said filling opening in a threaded relation, an impermeable membrane positioned between the vent plug and the filling opening in the threaded portions and an adhesive between the membrane and the container adhering to the container to hold the membrane in position to form the seal.

2. The combination set forth in claim 1 further characterized by the film being formed of polyethyleneterephthalate.

3. The combination set forth in claim 2, further characterized by the adhesive being a pressure sensitive acrylate material.

References Cited in the file of this patent

UNITED STATES PATENTS

| | | |
|---|---|---|
| 1,329,181 | Holland et al. | Jan. 27, 1920 |
| 2,388,738 | Gudheim | Nov. 13, 1945 |
| 2,872,499 | Rowls et al. | Feb. 3, 1959 |
| 2,880,900 | Foye | Apr. 7, 1959 |

FOREIGN PATENTS

| | | |
|---|---|---|
| 383,201 | Great Britain | Nov. 10, 1932 |